(12) United States Patent
Yamazaki (10) Patent No.: US 12,428,763 B2
(45) Date of Patent: Sep. 30, 2025

(54) METHOD OF PRODUCING INORGANIC FIBER MAT AND INORGANIC FIBER MAT

(71) Applicant: IBIDEN CO., LTD., Ogaki (JP)

(72) Inventor: Tomohisa Yamazaki, Takahama (JP)

(73) Assignee: IBIDEN CO., LTD., Ogaki (JP)

(*) Notice: Subject to any disclaimer, the term of this patent is extended or adjusted under 35 U.S.C. 154(b) by 0 days.

(21) Appl. No.: 18/700,263

(22) PCT Filed: Dec. 6, 2023

(86) PCT No.: PCT/JP2023/043608
§ 371 (c)(1),
(2) Date: Apr. 10, 2024

(87) PCT Pub. No.: WO2024/122568
PCT Pub. Date: Jun. 13, 2024

(65) Prior Publication Data
US 2024/0337053 A1   Oct. 10, 2024

(30) Foreign Application Priority Data

Dec. 9, 2022  (JP) ................. 2022-197140
May 25, 2023  (JP) ................. 2023-086218

(51) Int. Cl.
*D04H 1/72*   (2012.01)
*D04H 1/4209*   (2012.01)
*D21B 1/12*   (2006.01)

(52) U.S. Cl.
CPC ........... *D04H 1/72* (2013.01); *D04H 1/4209* (2013.01); *D21B 1/12* (2013.01); *D10B 2101/02* (2013.01)

(58) Field of Classification Search
CPC .... D04H 1/72; D04H 1/4209; D10B 2101/02; D21B 1/12
USPC ........................................... 428/297.4
See application file for complete search history.

(56) References Cited

U.S. PATENT DOCUMENTS

| 2003/0127175 | A1 | 7/2003 | Shoji et al. |
| 2003/0203154 | A1 | 10/2003 | Shoji et al. |
| 2008/0078151 | A1* | 4/2008 | Kariya ............ D21H 13/36 428/221 |

(Continued)

FOREIGN PATENT DOCUMENTS

| CN | 101581245 | 11/2009 |
| CN | 103114891 | 5/2013 |

(Continued)

OTHER PUBLICATIONS

International Search Report for corresponding International Application No. PCT/JP2023/043608, Feb. 27, 2024 (w/ machine translation).

(Continued)

*Primary Examiner* — Camie S Thompson
(74) *Attorney, Agent, or Firm* — MORI & WARD, LLP (57) ABSTRACT

Provided is a method of producing an inorganic fiber mat, the method including: a preparing step of preparing a first inorganic fiber molding including an organic binder attached thereto and derived from a needle-punched mat; a defibrating step of defibrating the first inorganic fiber molding to obtain defibrated inorganic fibers; and a papermaking step of forming the inorganic fiber mat by papermaking using a slurry containing the defibrated inorganic fibers.

12 Claims, 3 Drawing Sheets

(56) References Cited

U.S. PATENT DOCUMENTS

| | | |
|---|---|---|
| 2009/0285726 A1 | 11/2009 | Ohshika et al. |
| 2010/0040513 A1* | 2/2010 | Kariya .................. F01N 3/2864 422/177 |
| 2011/0227251 A1 | 9/2011 | Kariya et al. |
| 2012/0110805 A1 | 5/2012 | Ohshika et al. |
| 2013/0118138 A1 | 5/2013 | Kumano |
| 2021/0339515 A1 | 11/2021 | Holowczak et al. |

FOREIGN PATENT DOCUMENTS

| | | |
|---|---|---|
| JP | 09-210289 | 8/1997 |
| JP | 2001-335379 | 12/2001 |
| JP | 2007-021578 | 2/2007 |
| JP | 2008-007933 | 1/2008 |
| JP | 2008-082310 | 4/2008 |
| JP | 2010-209501 | 9/2010 |
| JP | 2014-009637 | 1/2014 |

OTHER PUBLICATIONS

Written Opinion for corresponding International Application No. PCT/JP2023/043608, Feb. 27, 2024 (w/ machine translation).

Office Action with Form PTO-892 Notice of References Cited issued by the United States Patent and Trademark Office for the co-pending U.S. Appl. No. 18/912,600, filed Jan. 22, 2025.

Office Action issued by the United States Patent and Trademark Office for the co-pending U.S. Appl. No. 18/912,600, filed Apr. 17, 2025.

Advisory Action issued by the United States Patent and Trademark Office for the co-pending U.S. Appl. No. 18/912,600, Jul. 15, 2025.

Office Action with Form PTO-892 Notice of Reference Cited issued by the United States Patent and Trademark Office for the co-pending U.S. Appl. No. 18/912,600, Jul. 25, 2025.

* cited by examiner

METHOD OF PRODUCING INORGANIC FIBER MAT AND INORGANIC FIBER MAT

TECHNICAL FIELD

The present invention relates to a method of producing an inorganic fiber mat and an inorganic fiber mat.

BACKGROUND ART

Various exhaust gas purification apparatuses that collect particulate matters (PM) in an exhaust gas or purify harmful gas components have been proposed. Such exhaust gas purification apparatuses include an exhaust gas treatment body including a porous ceramic material such as silicon carbide or cordierite, a casing for housing the exhaust gas treatment body, and an inorganic fiber mat material (a holding sealing material) arranged between the exhaust gas treatment body and the casing. The mat material is arranged mainly for, for example, preventing the exhaust gas treatment body from being damaged by contact with the casing that covers the outer periphery of the exhaust gas treatment body due to vibrations and impacts caused by the operation of automobiles or the like, and preventing exhaust gas leakage from a space between the exhaust gas treatment body and the casing.

Such an inorganic fiber mat material is prepared by punching or cutting a large inorganic fiber mat sheet into a predetermined shape. This causes the edges of the sheet to be offcuts. In response to recent demands for reduction of industrial waste, offcuts generated during production are required to be reused instead of being discarded.

Patent Literature 1 discloses a method of producing an insulating molding, the method including: defibrating a waste material of an inorganic fiber insulator; mixing the defibrated insulator with new inorganic fibers to prepare a cotton-like product; mixing the cotton-like product with a binder; and molding the mixture.

Patent Literature 2 discloses a method of producing a fiber molding, the method including: mixing ceramic fibers with ionic organic binder powder; adding water containing a heat resistant inorganic binder to the mixture and mixing them so that the mixture is almost wet as a whole; filling a mold with the wet mixture; and molding the wet mixture under pressure. In the method, part of the ceramic fibers is replaced by a finely crushed used fiber product.

CITATION LIST

Patent Literature

Patent Literature 1: JP H9-210289 A
Patent Literature 2: JP 2001-335379 A

SUMMARY OF INVENTION

Technical Problem

The methods disclosed in Patent Literatures 1 and 2 however have a problem in that the formability into the product is insufficient.

The present invention has been made in view of the above problem, and aims to provide a method of producing an inorganic fiber mat capable of easily forming a mat even when an inorganic fiber molding is used as an inorganic fiber material.

Solution to Problem

The present inventors have conducted extensive studies and found that use of inorganic fibers including an organic binder attached thereto and derived from a needle-punched mat can facilitate the formability into a new inorganic fiber mat.

Specifically, a method of producing an inorganic fiber mat of the present invention (hereinafter also referred to as a production method of the present invention) includes a preparing step of preparing a first inorganic fiber molding including an organic binder attached thereto and derived from a needle-punched mat; a defibrating step of defibrating the first inorganic fiber molding to obtain defibrated inorganic fibers; and a papermaking step of forming the inorganic fiber mat by papermaking using a slurry containing the defibrated inorganic fibers.

In the method of producing an inorganic fiber mat of the present invention, inorganic fibers including an organic binder attached thereto and derived from a needle-punched mat are used. Thus, the inorganic fibers are not excessively defibrated and an inorganic fiber mat with excellent formability is produced.

In the method of producing an inorganic fiber mat of the present invention, preferably, a second inorganic fiber molding derived from a papermaking mat is further used.

Owing to the use of the second inorganic fiber molding derived from a papermaking mat, an inorganic fiber mat having both resilience and wrapability can be produced.

In the method of producing an inorganic fiber mat of the present invention, preferably, the first inorganic fiber molding and the second inorganic fiber molding each contain an inorganic binder.

The first inorganic fiber molding and the second inorganic fiber molding each containing an inorganic binder can provide an inorganic fiber mat in which the inorganic binder is highly dispersed.

Preferably, in the method of producing an inorganic fiber mat of the present invention, the first inorganic fiber molding and the second inorganic fiber molding include offcuts.

Use of offcuts as an inorganic fiber material enables the effective use of the offcuts instead of discarding thereof.

Preferably, an average fiber length of inorganic fibers constituting the needle-punched mat is 3.0 to 100 mm.

When the average fiber length of the inorganic fibers constituting the needle-punched mat falls within the above range, the production method of the present invention can provide an inorganic fiber mat having both higher resilience and higher wrapability.

Preferably, the defibrating includes only wet defibration.

Defibration of inorganic fibers only by wet defibration can simplify the defibrating step.

Preferably, the needle-punched mat is formed by folding a thin layer sheet of an inorganic fiber precursor multiple times into a layered body with a predetermined width, and firing the layered body.

An offcut of such a needle-punched mat has a high proportion of inorganic fibers with long fiber lengths. When such an offcut is used as a material, the production method of the present invention can provide an inorganic fiber mat with a high surface pressure.

Preferably, the first inorganic fiber molding and the second inorganic fiber molding are each cut before the defibrating step.

When the inorganic fiber moldings are cut before the defibrating step, the defibrating step can proceed smoothly.

Preferably, in the method of producing an inorganic fiber mat of the present invention, the slurry further contains new inorganic fibers, and the new inorganic fibers and the defibrated inorganic fibers have the same composition and are alumina-silica fibers containing 60 to 80% by weight of $Al_2O_3$.

By adding new inorganic fibers to the slurry, the production method of the present invention can provide an inorganic fiber mat having desired properties. When the new inorganic fibers and the defibrated inorganic fibers have the same composition, they have the same thermal expansion coefficient. Thus, the surface pressure can be maintained without shifting the adhesion between the fibers at high temperature. Furthermore, when the inorganic fibers are alumina-silica fibers containing 60 to 80% by weight of $Al_2O_3$, they can provide an inorganic fiber mat having high resilience and high heat resistance.

Preferably, the method of producing an inorganic fiber mat further includes a firing step of firing the first inorganic fiber molding and the second inorganic fiber molding before the defibrating step.

When the organic binder attached to the first inorganic fiber molding and the organic binder attached to the second inorganic fiber molding are removed by firing before the defibrating step, the defibrating can proceed smoothly.

Preferably, the firing is performed at 700° C. to 1000° C. for one to eight hours.

When the firing is performed under the above conditions, the organic binder can be more reliably removed.

Preferably, in the method of producing an inorganic fiber mat of the present invention, an inorganic binder and an organic binder are added to the slurry.

When an inorganic binder is added, the production method of the present invention can provide an inorganic fiber mat with a higher surface pressure. When an organic binder is added, the production method of the present invention can provide an inorganic fiber mat with excellent formability.

Preferably, the inorganic fiber mat formed by papermaking in the papermaking step is heated and dried at a temperature of 150° C. to 210° C. for five minutes to one hour.

An inorganic fiber mat of the present invention includes: inorganic fibers derived from a needle-punched mat; inorganic fibers derived from a papermaking mat; an inorganic binder; and an organic binder.

The inorganic fiber mat of the present invention including inorganic fibers derived from a needle-punched mat and inorganic fibers derived from a papermaking mat has both resilience and wrapability.

Preferably, the inorganic fiber mat of the present invention may contain a particle obtained by firing an inorganic binder derived from at least one of the needle-punched mat or the papermaking mat; and a mixture of an unfired inorganic binder and an organic binder.

When a needle-punched mat containing an inorganic binder is fired and used as an inorganic fiber material, the inorganic fiber mat of the present invention contains a particle obtained by firing an inorganic binder derived from the needle-punched mat. When an inorganic binder and an organic binder are added to the inorganic fibers, the inorganic fiber mat of the present invention contains a mixture of an unfired inorganic binder and an organic binder. For example, when the inorganic binder is silica sol, the inorganic binder in the mixture is unfired amorphous silica, and when the inorganic binder is alumina sol, the inorganic binder in the mixture is unfired amorphous alumina.

Preferably, the particle obtained by firing has a major axis of 0.01 to 4 μm and the mixture has a major axis of 5 to 20 μm.

Preferably, the particle obtained by firing is a glassy particle or a particle including a crystal and a glass.

When the inorganic binder derived from at least one of the needle-punched mat or the papermaking mat is silica sol, for example, no crystals are formed under the firing conditions in the production method of the present invention (700° C. to 1000° C., one to eight hours), and the particle obtained by firing is silica glass. When the inorganic binder derived from at least one of the needle-punched mat or the papermaking mat is alumina sol, crystals are formed by firing at 500° C. or higher, and the particle obtained by firing an inorganic binder is alumina glass partly including γ-alumina crystals under the firing conditions in the production method of the present invention.

Preferably, the particle obtained by firing is adhered to a surface of the inorganic fibers; and the mixture coats a contact area between the inorganic fibers and a surface of the inorganic fibers or the mixture in the form of a lump is adhered to the surface of the inorganic fibers.

DESCRIPTION OF EMBODIMENTS

The following describes embodiments of the present invention. The present invention is not limited to the embodiments described below, and suitable modifications may be made without departing from the gist of the present invention.

(Method of Producing Inorganic Fiber Mat)

In the method of producing an inorganic fiber mat of the present invention, a first inorganic fiber molding including an organic binder attached thereto and derived from a needle-punched mat is used as a material of an inorganic fiber mat.

A needle-punched mat is produced by needling a mat containing inorganic fibers. The needling refers to a treatment in which a fiber entangling means such as a needle is inserted into and pulling out from a mat containing inorganic fibers. The needle-punched mat used as the first inorganic fiber molding includes multiple intertwined portions formed by needling on at least one of the front surface or the back surface.

The average fiber length of the inorganic fibers constituting the needle-punched mat needs to be a certain length for forming an intertwined structure. The average fiber length of the inorganic fibers constituting the needle-punched mat is preferably 3.0 to 100 mm. When the average fiber length of the inorganic fibers constituting the needle-punched mat falls within the above range, the production method of the present invention can provide an inorganic fiber mat having both higher resilience and higher wrapability. The average fiber size (diameter) of the inorganic fibers constituting the needle-punched mat is preferably 2 to 10 μm, more preferably 3 to 7 μm.

Herein, the average fiber length and average fiber diameter of inorganic fibers are determined by observing randomly selected 100 inorganic fibers of a holding sealing material in the field of a scanning electron microscope (SEM).

The inorganic fibers constituting the first inorganic fiber molding are not limited. Desirably, the inorganic fibers include at least one selected from the group consisting of alumina fibers, silica fibers, alumina-silica fibers, mullite fibers, biosoluble fibers, and glass fibers. When the inorganic fibers include at least one selected from the group consisting of alumina fibers, silica fibers, alumina-silica fibers, and mullite fibers, which have excellent heat resistance, an exhaust gas treatment body does not undergo deterioration or the like even when the exhaust gas treatment body is exposed to sufficiently high temperature, and can provide a mat material sufficiently having its function. When the inorganic fibers are biosoluble fibers, they do not damage the health of workers even if the workers inhale scattered inorganic fibers during production of an exhaust gas purification apparatus using a mat material. This is because the biosoluble fibers are dissolved in the body.

The alumina fibers may contain additives such as calcia, magnesia, and zirconia, in addition to alumina.

The $Al_2O_3/SiO_2$ compositional ratio by weight in alumina-silica fibers is preferably $Al_2O_3:SiO_2=60:40$ to 80:20, more preferably $Al_2O_3:SiO_2=70:30$ to 74:26.

Examples of the alumina-silica fibers include those containing 60 to 80% by weight of $Al_2O_3$.

An organic binder is attached to the first inorganic fiber molding. Examples of the organic binder include acrylic latex and rubber latex.

In the production method of the present invention, a second inorganic fiber molding derived from a papermaking mat may be used together with the first inorganic fiber molding. A papermaking mat is produced by subjecting a mat containing inorganic fibers to papermaking treatment. The papermaking treatment herein refers to a treatment in which inorganic fibers are defibrated, a slurry of the defibrated fibers is prepared, and the fibers are formed into a mat.

The average fiber length of the inorganic fibers constituting the papermaking mat is preferably about 0.01 to 5.0 mm. A preferred average fiber size (diameter) of the inorganic fibers constituting the papermaking mat is the same as that of the inorganic fibers constituting the needle-punched mat.

Owing to the use of the second inorganic fiber molding derived from a papermaking mat together with the first inorganic fiber molding, an inorganic fiber mat having both resilience and wrapability can be produced.

The inorganic fibers of the first inorganic fiber molding and the inorganic fibers of the second inorganic fiber molding may have the same composition or different compositions.

When the second inorganic fiber molding is used, the proportions of the first inorganic fiber molding and the second inorganic fiber molding are not limited. To produce an inorganic fiber mat having both resilience and wrapability by the production method of the present invention, the proportion of the first inorganic fiber molding based on the total weight of the first inorganic fiber molding and the second inorganic fiber molding is preferably 5 to 95% by weight, more preferably 70 to 90% by weight.

An organic binder may be attached to the second inorganic fiber molding. The composition of the organic binder may be the same as that of the organic binder for the first inorganic fiber molding.

Preferably, the first inorganic fiber molding and the second inorganic fiber molding each contain an inorganic binder. This is because when the first inorganic fiber molding and the second inorganic fiber molding each contain an inorganic binder, the method of the present invention can provide a new inorganic fiber mat in which the inorganic binder is highly dispersed.

The inorganic binder may be contained in either the first inorganic fiber molding or the second inorganic fiber molding, or in each of the first inorganic fiber molding and the second inorganic fiber molding. Preferably, the organic binder is contained in each of the first inorganic fiber molding and the second inorganic fiber molding.

The inorganic binder may be any suitable hard ceramic material such as at least one of alumina, silica, silicon carbide, zirconia, boron nitride, diamond, or pumice, or a combination thereof. Preferred are alumina sol and silica sol.

Preferably, the first inorganic fiber molding and the second inorganic fiber molding include offcuts. Offcuts refer to the remaining pieces of a material from which the necessary parts have been removed. A holding sealing material or the like for an exhaust gas purification apparatus is prepared by punching or cutting a large inorganic fiber material mat sheet into a predetermined shape. This causes the edges of the sheet to be offcuts. Use of such offcuts as an inorganic fiber material is preferred in that the offcuts can be effectively used instead of being discarded.

Figure 1:
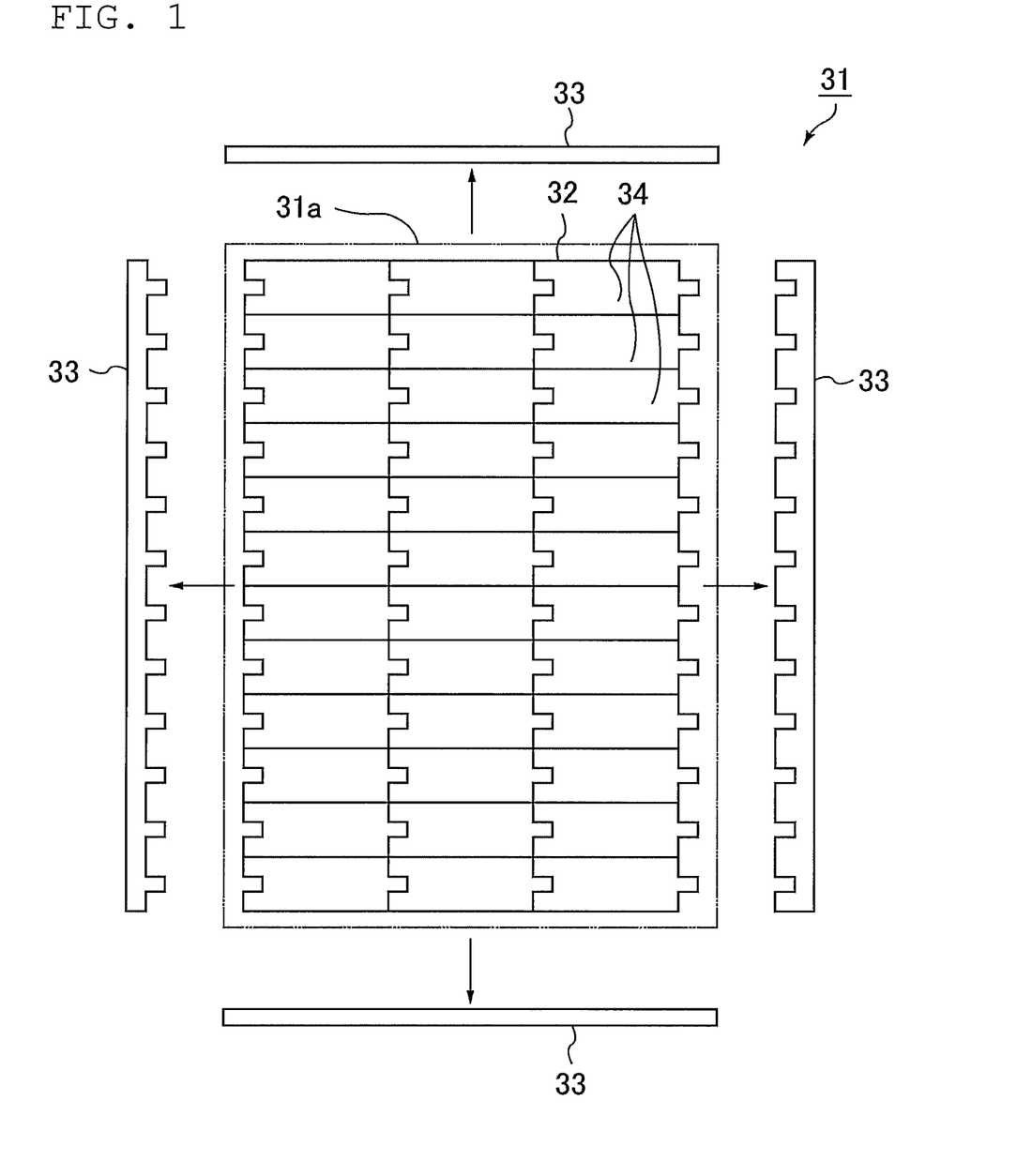
FIG. 1 shows a plan view including holding sealing materials for an exhaust gas purification apparatus and offcuts cut from an inorganic fiber mat material.

FIG. 1 shows a plan view including holding sealing materials for an exhaust gas purification apparatus and offcuts cut from an inorganic fiber mat material. In a production site of holding sealing materials, multiple holding sealing materials are cut out from a single large inorganic fiber mat material. First, as shown in FIG. 1, an inorganic fiber mat material 31 is divided into a holding sealing material forming portion 32 and offcuts 33. The inorganic fiber mat material 31 before cutting is outlined by an outer edge 31a of the inorganic fiber mat material. Next, the holding sealing material forming portion 32 is divided into individual holding sealing materials 34.

The pattern of cutting of the holding sealing material forming portion 32 is designed so as to increase the number of linear portions for efficient cutting and reduce the offcuts 33 as much as possible. When the holding sealing materials 34 have irregularities, each offcut 33 may have irregularities.

More preferably, in the production method of the present invention, such offcuts of different shapes, with at least one of the offcuts having irregularities, are used as inorganic fiber materials.

When the holding sealing material forming portion 32 is cut out from the center portion of the inorganic fiber mat material 31, an offcut 33 having a frame shape is obtained. The offcut 33 having a frame shape may be used as it is in the production method of the present invention. The offcut 33 may be cut in the vertical direction and the horizontal direction to obtain offcuts 33 of various shapes.

Figure 2A:
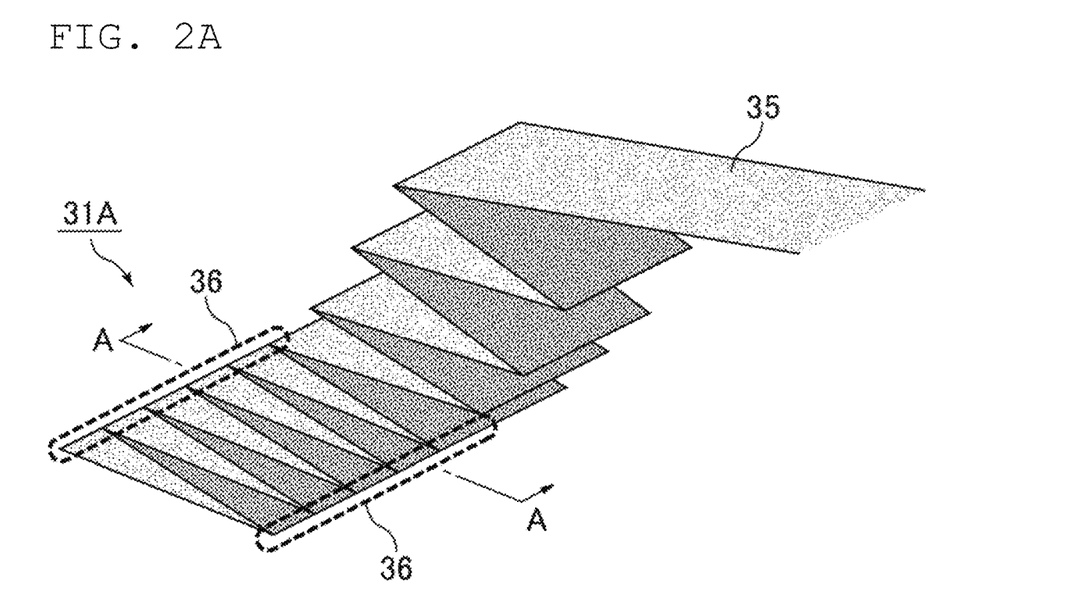
FIG. 2A shows a schematic diagram of a production example of a needle-punched mat folded into a layered body.
Figure 2B:
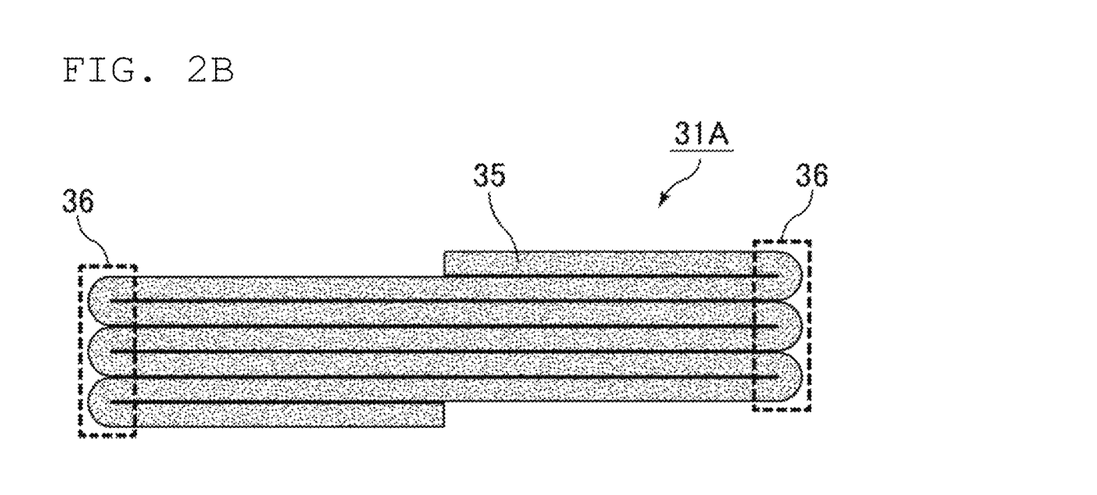
FIG. 2B shows a cross-sectional view of the needle-punched mat folded into a layered body produced as shown in FIG. 2A, taken along the line A-A.

Preferably, in the production method of the present invention, the needle-punched mat is formed by folding a thin layer sheet of an inorganic fiber precursor multiple times into a layered body with a predetermined width, and firing the layered body. Such a needle-punched mat is also referred to as a needle-punched mat folded into a layered body. FIG. 2A shows a schematic diagram of a production example of a needle-punched mat folded into a layered body. FIG. 2B shows a cross-sectional view of the needle-punched mat folded into a layered body produced as shown in FIG. 2A, taken along the line A-A. As shown in FIGS. 2A and 2B, a needle-punched mat 31A before firing is formed by folding a thin layer sheet 35 of an inorganic fiber precursor multiple times into a layered body with a predetermined width. As shown in FIG. 2A, the thin layer sheet 35 of the inorganic fiber precursor is folded while the sheet is continuously shifted in the direction perpendicular to the direction of folding. The width of each fold and number of folds may be, but not limited to, 1000 mm or more and five times or more, respectively, for example. In the needle-punched mat 31A before firing, folded portions 36 have a high proportion of long inorganic fibers.

When offcuts including such folded portions are used as inorganic fiber materials, the production method of the present invention can provide an inorganic fiber mat with a high surface pressure.

The needle-punched mat folded into a layered body can be produced, for example, by the method described in JP 2008-7933 A.

The method of producing an inorganic fiber mat of the present invention includes: a defibrating step of defibrating the first inorganic fiber molding to obtain defibrated inorganic fibers; and a papermaking step of forming the inorganic fiber mat by papermaking using a slurry containing the defibrated inorganic fibers. The second inorganic fiber molding, when used, may be defibrated together with the first inorganic fiber molding or may be defibrated separately from the first inorganic fiber molding to obtain inorganic fibers.

As described above, when the first inorganic fiber molding and the second inorganic fiber molding contain an organic binder, the first inorganic fiber molding and the second inorganic fiber molding are preferably fired in a firing step before the defibrating step. The firing is performed, for example, at 700° C. to 1000° C. for one to eight hours. When the firing is performed under the above conditions, the organic binder can be more reliably removed. The firing temperature is preferably 800° C. to 950° C.

The defibration in the defibrating step can be performed by a single treatment of wet defibration only, or by a two-step treatment including dry defibration and wet defibration. In the production method of the present invention, to simplify the defibrating step, the defibrating step is preferably performed only by wet defibration.

The wet defibration can be performed using a wet defibrating apparatus such as a pulper or a mixer. The wet defibration can be performed by putting the first inorganic fiber molding and an optional second inorganic fiber molding into water and stirring the contents. When the second inorganic fiber molding is used, the first inorganic fiber molding and the second inorganic fiber molding are added in any order. Preferably, the first inorganic fiber molding is first put into water, followed by stirring, and then the second inorganic fiber molding is put thereinto, followed by stirring, or the first inorganic fiber molding and the second inorganic fiber molding are simultaneously put into water, followed by stirring. Preferably, in the production method of the present invention, to fully defibrate the first inorganic fiber molding, the first inorganic fiber molding is first put into water, followed by stirring, and then the second inorganic fiber molding is put thereinto, followed by further stirring.

When the dry defibration is performed, it is performed before wet defibration. The dry defibration may be performed using an apparatus such as a feather mill.

Before the defibrating step, the first inorganic fiber molding and the second inorganic fiber molding may each be cut into pieces each having desired dimensions in advance. When each inorganic fiber molding is cut before the defibrating step, the defibrating step can proceed smoothly. When offcuts are used as the first inorganic fiber molding and the second inorganic fiber molding, each offcut may be used as it is without cutting before the defibrating step.

Here, the average fiber length of the inorganic fibers to be obtained can be adjusted by changing the treatment conditions of wet defibration and dry defibration (e.g., stirring speed, stirring time). Examples of the treatment conditions for wet defibration include a stirring speed of 500 to 1000 rpm and a stirring time of 200 to 900 seconds. Preferably, the stirring speed is 650 to 850 rpm and the stirring time is 500 to 700 seconds, and more preferably, the stirring speed is 700 to 800 rpm and the stirring time is 500 to 650 seconds.

Through such a defibrating step, inorganic fibers having a desired fiber length distribution can be obtained. Whether the inorganic fibers have a desired fiber length distribution can be confirmed by determining the bulk density.

Next, a papermaking step of forming an inorganic fiber mat by papermaking is performed using a slurry containing the defibrated inorganic fibers.

The slurry can be prepared, for example, as follows.

First, a liquid containing water and defibrated inorganic fibers is prepared so that the concentration of inorganic fibers is about 0.5 to 2.0% by weight. When additional water or additional defibrated inorganic fibers are added to the liquid during slurry preparation, they are stirred with a stirrer for about 20 to 120 seconds. Next, an organic binder is added to the liquid in an amount of about 0.5 to 10% by weight relative to the weight of the inorganic fibers, and the contents are stirred for about one to five minutes. Further, an inorganic binder is added to the liquid in an amount of about 0.5 to 3% by weight relative to the weight of the inorganic fibers, and the contents are stirred for about one to five minutes. Further, a flocculant is added to the liquid in an amount of about 0.01 to 1.0% by weight relative to the weight of the inorganic fibers, and the contents are stirred for about two minutes at most to prepare a slurry.

The slurry preferably further contains new inorganic fibers. By adding new inorganic fibers to the slurry, the production method of the present invention can provide an inorganic fiber mat having desired properties. Here, the "new inorganic fibers" refer to fibers that have been formed for the first time as inorganic fibers and have never been used as a product.

The average fiber length of new inorganic fibers can be adjusted depending on target properties, and is preferably about 0.01 mm to 100 mm. A preferred average fiber size (diameter) of the new inorganic fibers is the same as that of the inorganic fibers constituting the needle-punched mat or that of the inorganic fibers constituting the papermaking mat.

The composition of the new inorganic fibers may be the same as those exemplified as the inorganic fibers constituting the first inorganic fiber molding and the inorganic fibers constituting the second inorganic fiber molding. Preferably, the composition of the new inorganic fibers is the same as the composition of the inorganic fibers constituting the first inorganic fiber molding and the composition of the inorganic fibers constituting the second inorganic fiber molding. When these inorganic fibers have the same composition, they have the same thermal expansion coefficient. Thus, the surface pressure can be maintained without shifting the adhesion between the fibers at high temperature.

More preferably, the new inorganic fibers, the inorganic fibers constituting the first inorganic fiber molding, and the inorganic fibers constituting the second inorganic fiber molding are alumina-silica fibers containing 65 to 80% by weight of $Al_2O_3$. This is because such inorganic fibers can provide an inorganic fiber mat having improved resilience and improved heat resistance.

The inorganic binder to be added during slurry preparation may be the same as the inorganic binder contained in the first inorganic fiber molding and the second inorganic fiber molding. The organic binder may be latex or the like, and the flocculant may be any of known ones.

Preferably, in the production method of the present invention, an inorganic binder is added during slurry preparation. When the first inorganic fiber molding and the second inorganic fiber molding each contain an inorganic binder, an inorganic binder may not be additionally added in the papermaking step. Even when an inorganic binder is additionally added, the amount thereof may be smaller than the amount of the initial inorganic binder. Even when the first inorganic fiber molding and the second inorganic fiber molding each contain an inorganic binder, an inorganic binder in the same amount as described above may be added to the slurry. When an inorganic binder is added during slurry preparation, the production method of the present invention can provide an inorganic fiber mat having a higher surface pressure.

When the first inorganic fiber molding and the second inorganic fiber molding contain an inorganic binder, the material of the inorganic binder to be added in the papermaking step may be the same as or different from the material of the inorganic binder contained in the first inorganic fiber molding and the second inorganic fiber molding.

Preferably, in the production method of the present invention, an organic binder is added during slurry preparation. When an organic binder is added, the production method of the present invention can provide an inorganic fiber mat with excellent formability.

More preferably, in the production method of the present invention, an inorganic binder and an organic binder are added during slurry preparation.

The formation of an inorganic fiber mat by papermaking using a slurry can be performed, for example, as follows.

The prepared slurry is poured into a mold of a desired shape, a raw material sheet is molded, and water is removed from the sheet. Usually, the molding machine is equipped with a filtration wire mesh (mesh size: 30 mesh) at its bottom. Through the filtration wire mesh, water in the slurry poured into the molding machine is discharged. Use of such a molding machine enables molding of a raw material sheet and removal of water from the raw material sheet at the same time. If necessary, water may be forcibly sucked from the bottom of the molding machine through the filtration wire mesh using a suction pump, a vacuum pump, or the like.

Next, the obtained raw material sheet is taken out from the molding machine. The raw material sheet is compressed using a press or the like so that the thickness thereof is reduced to about 0.3 to 0.5 times the original thickness, while the raw material sheet is heated and dried at a temperature of 150° C. to 210° C. for five minutes to one hour, for example. Thereby, an inorganic fiber mat can be obtained.

The inorganic fiber mat obtained by the production method of the present invention may be cut into pieces each having a desired shape, which may be used as holding sealing materials for an exhaust gas purification apparatus.

(Inorganic Fiber Mat)

The inorganic fiber mat of the present invention contains inorganic fibers derived from a needle-punched mat, inorganic fibers derived from a papermaking mat, an inorganic binder, and an organic binder. The inorganic fiber mat of the present invention is a papermaking mat and is formed by papermaking using a slurry containing inorganic fibers derived from a needle-punched mat, inorganic fibers derived from a papermaking mat, an inorganic binder, and an organic binder.

The needle-punched mat, the papermaking mat, the inorganic fibers, the inorganic binder, and the organic binder may be the same as those exemplified in the method of producing an inorganic fiber mat of the present invention.

The inorganic fibers derived from a needle-punched mat and the inorganic fibers derived from a papermaking mat may be obtained by any method. An example of the method is the same method as the defibrating step in the method of producing an inorganic fiber mat of the present invention.

The inorganic fiber mat of the present invention preferably contains, particles obtained by firing an inorganic binder and an unfired (a mixture of a dried inorganic binder and an organic binder) inorganic binder. The particles obtained by firing an inorganic binder are formed by firing an inorganic binder derived from at least one of the needle-punched mat or the papermaking mat. At least one of the needle-punched mat or the papermaking mat contains an inorganic binder and an organic binder. When firing is performed to remove the organic binder in the inorganic fibers, glassy particles and/or particles containing a crystal and a glass are formed from the inorganic binder.

For example, when the inorganic binder is silica sol, few crystals are formed under the firing conditions in the production method of the present invention (e.g., 700° C. to 1000° C., one to eight hours), and silica glass particles are formed.

When the inorganic binder is alumina sol, crystals are formed by firing at 500° C. or higher, and alumina glass particles partly including crystalline γ-alumina are formed under the firing conditions in the production method of the present invention (e.g., 700° C. to 1000° C., one to eight hours).

The particles obtained by firing each preferably have a major axis of 0.01 to 4 μm.

Preferably, an inorganic binder other than the inorganic binder derived from a needle-punched mat and/or the inorganic binder derived from a papermaking mat is attached to the inorganic fiber mat of the present invention. When an inorganic binder is added to the material of the inorganic fiber mat after the firing, the inorganic binder is an amorphous inorganic binder that has not undergone the firing step.

The inorganic fiber mat of the present invention contains an organic binder. Preferably, in the inorganic fiber mat of the present invention, the unfired amorphous inorganic binder and the organic binder form a mixture. The mixture preferably has a major axis of 5 to 20 μm.

Figure 3:
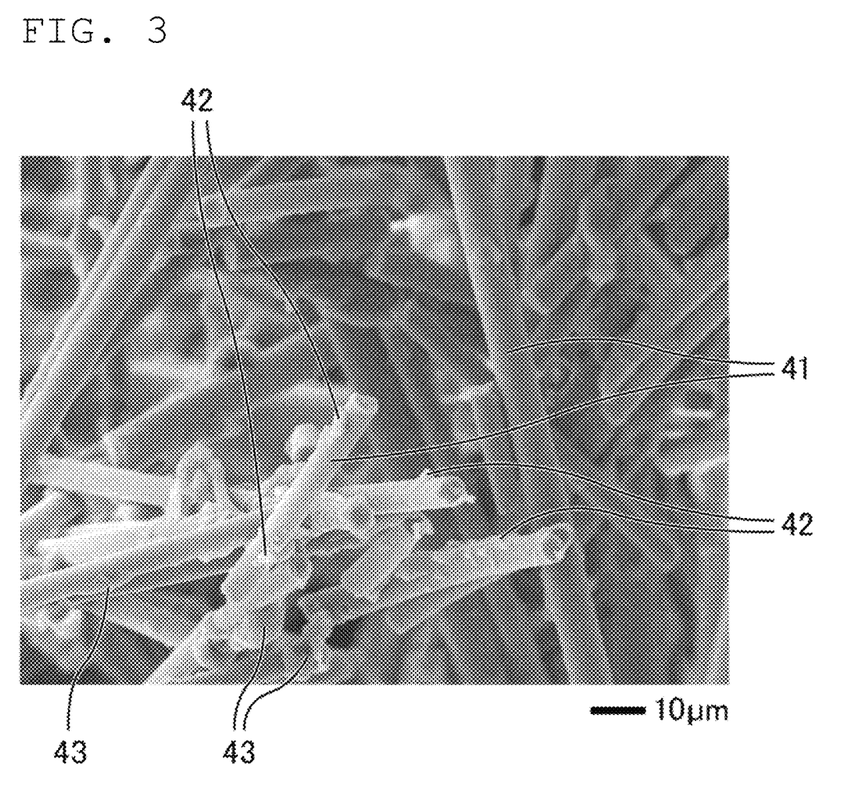
FIG. 3 shows an example of an enlarged electron microscope image of an inorganic fiber mat of the present invention.

FIG. 3 shows an example of an enlarged electron microscope image of an inorganic fiber mat of the present invention. As shown in FIG. 3, particle obtained by firing 42 are adhered to surfaces of inorganic fibers 41. A mixture 43 of an unfired amorphous inorganic binder and an organic binder coats the contact areas between the inorganic fibers 41 and the surfaces of the inorganic fibers 41, or the mixture 43 in the form of a lump is adhered to the surfaces of the inorganic fibers 41.

The inorganic fiber mat of the present invention including inorganic fibers derived from a needle-punched mat and inorganic fibers derived from a papermaking mat has both resilience and wrapability.

The inorganic fiber mat of the present invention can be produced, for example, by the method of producing an inorganic fiber mat of the present invention, and may be produced by any production method.

Herein, the following matters are disclosed.

The present disclosure (1) encompasses a method of producing an inorganic fiber mat, the method including: a preparing step of preparing a first inorganic fiber molding including an organic binder attached thereto and derived from a needle-punched mat; a defibrating step of defibrating the first inorganic fiber molding to obtain defibrated inorganic fibers; and a papermaking step of forming the inorganic fiber mat by papermaking using a slurry containing the defibrated inorganic fibers.

The present disclosure (2) encompasses the method of producing an inorganic fiber mat according to the present disclosure (1), wherein a second inorganic fiber molding derived from a papermaking mat is further used.

The present disclosure (3) encompasses the method of producing an inorganic fiber mat according to the present disclosure (2), wherein the first inorganic fiber molding and the second inorganic fiber molding each contain an inorganic binder.

The present disclosure (4) encompasses the method of producing an inorganic fiber mat according to the present disclosure (2) or (3), wherein the first inorganic fiber molding and the second inorganic fiber molding include offcuts.

The present disclosure (5) encompasses the method of producing an inorganic fiber mat according to any one of the present disclosures (1) to (4), wherein an average fiber length of inorganic fibers constituting the needle-punched mat is 3.0 to 100 mm.

The present disclosure (6) encompasses the method of producing an inorganic fiber mat according to any one of the present disclosures (1) to (5), wherein the defibrating includes only wet defibration.

The present disclosure (7) encompasses the method of producing an inorganic fiber mat according to any one of the present disclosures (1) to (6), wherein the needle-punched mat is formed by folding a thin layer sheet of an inorganic fiber precursor multiple times into a layered body with a predetermined width, and firing the layered body.

The present disclosure (8) encompasses the method of producing an inorganic fiber mat according to any one of the present disclosures (2) to (4), wherein the first inorganic fiber molding and the second inorganic fiber molding are each cut before the defibrating step.

The present disclosure (9) encompasses the method of producing an inorganic fiber mat according to any one of the present disclosures (1) to (8), wherein the slurry further contains new inorganic fibers, and the new inorganic fibers and the defibrated inorganic fibers have the same composition and are alumina-silica fibers containing 60 to 80% by weight of $Al_2O_3$.

The present disclosure (10) encompasses the method of producing an inorganic fiber mat according to the present disclosure (3), further including a firing step of firing the first inorganic fiber molding and the second inorganic fiber molding before the defibrating step.

The present disclosure (11) encompasses the method of producing an inorganic fiber mat according to the present disclosure (10), wherein the firing is performed at 700° C. to 1000° C. for one to eight hours.

The present disclosure (12) encompasses the method of producing an inorganic fiber mat according to any one of the present disclosures (1) to (11), wherein an inorganic binder and an organic binder are added to the slurry.

The present disclosure (13) encompasses the method of producing an inorganic fiber mat according to the present disclosure (12), wherein the inorganic fiber mat formed by papermaking in the papermaking step is heated and dried at a temperature of 150° C. to 210° C. for five minutes to one hour.

The present disclosure (14) encompasses an inorganic fiber mat including: inorganic fibers derived from a needle-punched mat; inorganic fibers derived from a papermaking mat; an inorganic binder; and an organic binder.

The present disclosure (15) encompasses the inorganic fiber mat according to the present disclosure (14), further including: a particle obtained by firing an inorganic binder derived from at least one of the needle-punched mat or the papermaking mat; and a mixture of an unfired inorganic binder and an organic binder.

The present disclosure (16) encompasses the inorganic fiber mat according to the present disclosure (15), wherein the particle obtained by firing has a major axis of 0.01 to 4 μm and the mixture has a major axis of 5 to 20 μm.

The present disclosure (17) encompasses the inorganic fiber mat according to the present disclosure (15) or (16), wherein the particle obtained by firing is a glassy particle or a particle including a crystal and a glass.

The present disclosure (18) encompasses the inorganic fiber mat according to any one of the present disclosures (15) to (17), wherein the particle obtained by firing is adhered to a surface of the inorganic fibers; and the mixture coats a contact area between the inorganic fibers and a surface of the inorganic fibers or the mixture in the form of a lump is adhered to the surface of the inorganic fibers.

REFERENCE SIGNS LIST 31 inorganic fiber mat material
31A needle-punched mat before firing
31a outer edge
32 holding sealing material forming portion
33 offcut
34 holding sealing material
35 thin layer sheet of inorganic fiber precursor
36 folded portion
41 inorganic fiber
42 particle obtained by firing
43 mixture of amorphous inorganic binder and organic binder

The invention claimed is:

1. A method of producing an inorganic fiber mat, the method comprising:
   a preparing step of preparing a first inorganic fiber molding including an organic binder attached thereto and derived from a needle-punched mat;
   a defibrating step of defibrating the first inorganic fiber molding prepared in the preparing step to obtain defibrated inorganic fibers; and
   a papermaking step of forming the inorganic fiber mat by papermaking using a slurry containing the defibrated inorganic fibers.

2. The method of producing an inorganic fiber mat according to claim 1,
   wherein an average fiber length of inorganic fibers constituting the needle-punched mat is 3.0 to 100 mm.

3. The method of producing an inorganic fiber mat according to claim 1,
wherein the defibrating step is performed only by wet defibration.

4. The method of producing an inorganic fiber mat according to claim 1,
wherein the needle-punched mat is formed by folding a thin layer sheet of an inorganic fiber precursor multiple times into a layered body with a predetermined width, and firing the layered body.

5. The method of producing an inorganic fiber mat according to claim 1,
wherein the slurry further contains new inorganic fibers, and the new inorganic fibers and the defibrated inorganic fibers have the same composition and are alumina-silica fibers containing 60 to 80% by weight of Al2O3.

6. The method of producing an inorganic fiber mat according to claim 1,
wherein an inorganic binder and an organic binder are added to the slurry.

7. The method of producing an inorganic fiber mat according to claim 6,
wherein the inorganic fiber mat formed by papermaking in the papermaking step is heated and dried at a temperature of 150° C. to 210° C. for five minutes to one hour.

8. A method of producing an inorganic fiber mat, the method comprising:
a preparing step of preparing a first inorganic fiber molding including an organic binder attached thereto and derived from a needle-punched mat;
a defibrating step of defibrating the first inorganic fiber molding to obtain defibrated inorganic fibers; and
a papermaking step of forming the inorganic fiber mat by papermaking using a slurry containing the defibrated inorganic fibers,
wherein a second inorganic fiber molding derived from a papermaking mat is further used, and
wherein the first inorganic fiber molding and the second inorganic fiber molding are each cut before the defibrating step.

9. A method of producing an inorganic fiber mat, the method comprising:
defibrating a first inorganic fiber molding including an organic binder attached thereto and derived from a needle-punched mat to obtain defibrated inorganic fibers; and
forming the inorganic fiber mat by papermaking using a slurry containing the defibrated inorganic fibers.

10. The method of producing an inorganic fiber mat according to claim 9,
wherein an average fiber length of inorganic fibers constituting the needle-punched mat is 3.0 to 100 mm.

11. The method of producing an inorganic fiber mat according to claim 9,
wherein the defibrating is performed only by wet defibration.

12. The method of producing an inorganic fiber mat according to claim 9,
wherein the needle-punched mat is formed by folding a thin layer sheet of an inorganic fiber precursor multiple times into a layered body with a predetermined width, and firing the layered body.

* * * * *